US008995366B2

(12) United States Patent
Nimbalker et al.

(10) Patent No.: US 8,995,366 B2
(45) Date of Patent: Mar. 31, 2015

(54) RADIO LINK MONITORING IN A WIRELESS COMMUNICATION DEVICE FOR A ENHANCED CONTROL CHANNEL

(75) Inventors: Ajit Nimbalker, Buffalo Grove, IL (US); Sandeep H. Krishnamurthy, Sunnyvale, CA (US); Robert T. Love, Barrington, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 158 days.

(21) Appl. No.: 13/428,464

(22) Filed: Mar. 23, 2012

(65) Prior Publication Data
US 2013/0250782 A1 Sep. 26, 2013

(51) Int. Cl.
*H04W 4/00* (2009.01)

(52) U.S. Cl.
USPC .................. 370/329; 455/434; 455/550.1

(58) Field of Classification Search
CPC ........ H04L 12/26; H04B 17/00; H04W 72/04
USPC ................. 370/329; 375/356; 455/434, 550.1
See application file for complete search history.

(56) References Cited

U.S. PATENT DOCUMENTS

| 8,711,709 | B2 * | 4/2014 | Marinier et al. | 370/242 |
| 2003/0054850 | A1 * | 3/2003 | Masseroni et al. | 455/522 |
| 2007/0097908 | A1 * | 5/2007 | Khandekar et al. | 370/329 |
| 2008/0019279 | A1 * | 1/2008 | Kim et al. | 370/241 |
| 2008/0267105 | A1 * | 10/2008 | Wang et al. | 370/311 |
| 2010/0034092 | A1 | 2/2010 | Krishnamurthy et al. | |
| 2010/0113008 | A1 * | 5/2010 | Wang et al. | 455/423 |
| 2011/0096680 | A1 * | 4/2011 | Lindoff et al. | 370/252 |
| 2011/0188481 | A1 | 8/2011 | Damnjanovic et al. | |
| 2011/0256861 | A1 * | 10/2011 | Yoo et al. | 455/423 |
| 2012/0176884 | A1 * | 7/2012 | Zhang et al. | 370/203 |
| 2012/0300718 | A1 | 11/2012 | Ji et al. | |
| 2013/0242886 | A1 * | 9/2013 | Chen et al. | 370/329 |

FOREIGN PATENT DOCUMENTS

| WO | 2011122833 A2 | 10/2011 |
| WO | 2011130665 A1 | 10/2011 |

OTHER PUBLICATIONS

3GPP TS 36.133 v10.5.0, "3rd Generation Partnership Project; Technical Specification Group Radio Access Network; Evolved Universal Terrestrial Radio Access (E-UTRA); Requirements for support of radio resource management (Release 10)", (Dec. 2011), pp. 49-52.
Motorola: "Details on radio link failure and recovery in LTE", 3GPP TSG-RAN WG4 Meeting #48, R4-081998, Jeju, South Korea, Aug. 18-22, 2008, all pages.ed.

(Continued)

*Primary Examiner* — Ricky Ngo
*Assistant Examiner* — Lan Huong Truong
(74) *Attorney, Agent, or Firm* — Lerner, David, Littenberg, Krumholz & Mentlik, LLP

(57) ABSTRACT

A method (400) and user equipment (106) monitor a radio link for a wireless communication terminal for an enhanced control channel. A processor (304) may receive a first type of reference signal. The processor may monitor a first type of control channel. The processor may estimate a first synchronization condition associated with the radio link based on the first type of reference signal. The processor may monitor the second type of control channel. The processor may estimate a second synchronization condition associated with the radio link based on a second type of reference signal.

20 Claims, 9 Drawing Sheets

(56) References Cited

OTHER PUBLICATIONS

Motorola: "Simulation results for out-of-sync and in-sync detection", 3GPP TSG-RAN WG4 Meeting #48, R4-082302, Edinburgh, UK, Sep. 29-Oct. 3, 2008, all pages.

Motorola: "Further details on out-of-sync and in-sync detection", 3GPP TSG-RAN WG4 Meeting #48bis, R4-082560, Edinburgh, UK, Sep. 29-Oct. 3, 2008, all pages.

Motorola: "Discussion of remaining aspects in radio link monitoring", 3GPP TSG-RAM WG4 Meeting #49, R4-083151, Prague, CZ, Nov. 10-14, 2008, all pages.

"3rd Generation Partnership Project; Technical Specification Group Radio Access Network; Evolved Universal Terrestrial Radio Access (E-UTRA); Physical layer procedures (Release 10)", 3GPP Standard; 3GPP TS 36.213, 3rd Generation Partnership Project (3GPP), Mobile Competence Centre; 650, Route Des Lucioles; F-06921 Sophia-Antipolis Cedex; France, vol. RAN WG1, No. V10.5.0, Mar. 7, 2012, pp. 1-125.

Patent Cooperation Treaty, International Search Report and Written Opinion of the International Searching Authority for International Application No. PCT/US2013/031120, Jun. 27, 2013, 10 pages.

\* cited by examiner

RADIO LINK MONITORING IN A WIRELESS COMMUNICATION DEVICE FOR A ENHANCED CONTROL CHANNEL

CROSS REFERENCE TO RELATED APPLICATIONS

The present application is related to the co-pending U.S. application Ser. No. 13/428,479 filed concurrently herewith, the contents of which are hereby incorporated by reference.

FIELD OF THE DISCLOSURE

The present disclosure relates to wireless communications and more particularly to radio link monitoring in a wireless communication terminal.

BACKGROUND

The Third Generation Partnership Project (3GPP) is developing a Long Term Evolution (LTE) system using a physical layer based on globally applicable evolved universal terrestrial radio access (E-UTRA). A mobile terminal or station (MS), also referred to as User Equipment (UE), may use a measurement based on a cell-specific reference signal as a metric to determine if a radio link with the base station is in synchronization or out of synchronization by determining whether reliable transmission of a physical downlink control channel (PDCCH) codeword with specific downlink message formats can be supported over the link.

In Release-8/9/10 of 3GPP, the UE Layer 1, such as or the physical layer, monitors the downlink radio link quality of the serving cell, such as from a base station, for the purpose of indicating radio problem detection status or radio link quality to higher layers. The radio problem detection may be based on cell-specific reference signals. In non-Discontinuous Reception (non-DRX) mode operations, such as when the UE is not in sleep mode, the UE in every radio frame checks the quality, measured over a time period, against thresholds (also known Qout and Qin) defined implicitly by relevant requirements for detecting out-of-sync (OOS) and in-sync (IS) conditions, where the term "sync" is synchronization. For every radio frame, the UE indicates radio problem detection to higher layers when the quality is worse than the threshold Qout and continues monitoring until either (a) the quality gets better than the threshold Qin, or (b) a radio link failure (RLF) is declared (after a certain timer expires) and the radio link recovery procedure is initiated. Typically, a UE experiencing radio link quality issues with one serving cell (or enhanced Node B (eNB) or enhanced Base Station) may be handed over to another serving cell (based on measurements provided by the UE to the eNB or network-aided measurements). However, for cases, e.g., where a UE in a connected state to a serving cell, but the UE suddenly experiences severe sustained quality degradation and cannot receive any messages from the serving cell, radio link failure occurs and radio link recovery procedure is considered useful.

Typically the requirements are defined based on whether or not a reference PDCCH Block Error Rate (BLER) is achieved for a particular downlink control channel configuration. For example, for the Rel-8/9/10 LTE, the OOS is reported to the higher layers from the lower layers if a hypothetical or reference PDCCH BLER becomes greater than 10% assuming the transmission of a Downlink Control Information (DCI) Format 1A at an eight CCE aggregation level, which, for example, corresponds to a small payload size Downlink (DL) grant (used for scheduling data or broadcast control transmissions) with the highest code protection (due to using eight CCEs where eight is the maximum that can be assigned for a DCI). An IS condition is reported if the hypothetical or reference PDCCH BLER drops below 2% assuming the transmission of a DCI Format 1C (with a certain different payload size) at a 4 CCE aggregation level, such as the downlink control message associated with (for scheduling) the transmission of a paging message or system information message (which may be typically broadcast information). In Rel-10 enhanced Inter Cell Interference Coordination (eICIC), the base station (or eNB) can further configure the UE to monitor the radio link quality in only a subset of subframes. Based on the OOS and IS events, if it is determined that the radio link quality is poor, Radio Link Failure (RLF) may be declared.

In Rel-11, an enhanced control channel, such as an enhanced PDCCH (ePDCCH), may be specified for an ability to support increased control channel capacity, an ability to support frequency-domain ICIC, an ability to achieve improved spatial reuse of control channel resource, an ability to support beamforming and/or diversity, and/or an ability to operate on the new carrier type and in Multicast/Broadcast over a Single Frequency Network (MBSFN) subframes.

If an enhanced control channel is specified, then there is a problem with adapting Radio Link Monitoring (RLM). In particular, there is a need for performing RLM at a UE on a Uu (eNB-UE) link when the eNB uses ePDCCH as a control channel to communicate with the UE.

BRIEF DESCRIPTION OF THE DRAWINGS

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

A method and user equipment to monitor a radio link for a wireless communication terminal when an enhanced control channel is configured is disclosed. A transceiver may maintain a radio link with a network base station. A processor may receive a first type of reference signal via the transceiver. The processor may monitor, at the user equipment, a first type of control channel, the first control channel demodulated based on a first type of reference signal. The processor may estimate a first synchronization condition associated with the radio link based on the first type of reference signal. The processor may acquire configuration information related to configuration of a second type of control channel, the second control channel demodulated based on a second type of reference signal, the second reference signal distinct from the first type of reference signal received on the first carrier. The processor may monitor the second type of control channel. The processor may estimate a second synchronization condition associated with the radio link based on a second type of reference signal. The processor may send an output from a current layer to a higher layer based on at least one of the estimated synchronization conditions.

Figure 1:
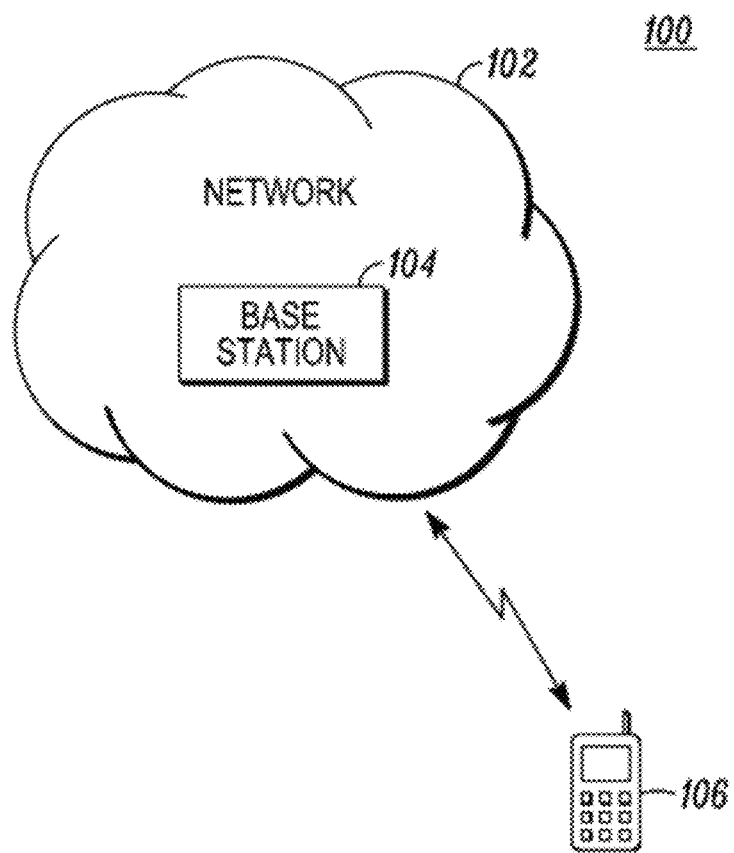
FIG. 1 is an example illustration of a communication system according to a possible embodiment.

FIG. 1 illustrates a communication system 100 including a network 102, base station, such as an eNB, 104 and user equipment (UE) 106. Various communication devices may exchange data or information through the network 102. The network 102 may be an evolved universal terrestrial radio access (E-UTRA) or other type of telecommunication network. A network entity, such as the base station 104, may assign a UE identifier (UEID) to the UE 106 when the UE 106 first joins the network 102. For one embodiment, the base station 104 may be a distributed set of servers in the network 102. The UE 106 may be one of several types of handheld or mobile devices, such as, a mobile phone, a laptop, or a personal digital assistant (PDA). In one embodiment, the UE 106 may be a wireless local area network capable device, a wireless wide area network capable device, or any other wireless device.

According to Release 8/9/10 of the E-UTRA or LTE standard, downlink communications from an eNB to a UE utilizes orthogonal frequency division multiplexing (OFDM). In OFDM, orthogonal subcarriers are modulated with a digital stream, which may include data, control information, or other information, so as to form a set of OFDM symbols. The subcarriers may be contiguous or discontiguous and the downlink data modulation may be performed using quadrature phase shift-keying (QPSK), 16-ary quadrature amplitude modulation (16QAM), or 64QAM and typically downlink control modulation is QPSK. The OFDM symbols are configured into a downlink subframe (typically 1 millisecond duration) for transmission from the base station. Each OFDM symbol has a time duration and is associated with a cyclic prefix (CP). A cyclic prefix is similar to a guard period between successive OFDM symbols in a subframe. Typically, the legacy Rel-8/9/10 control channel (PDCCH) is transmitted in the first few OFDM symbols at the beginning of the subframe and data is transmitted in the rest of the subframe.

The UE 106 may use an Enhanced Physical Downlink Control Channel (EPDCCH) to receive control information from the base station 104 (or from the network 102 in general). The EPDCCH may be Time Division Multiplexed (TDMed) with a Rel-8 PDCCH control channel and/or the EPDCCH may be the only Downlink (DL) control channel carrying Downlink Control Information (DCI) in a subframe. The EPDCCH may be of Frequency Division Multiplexed (FDM) structure, such as by spanning all Orthogonal Frequency Division Multiplexed (OFDM) symbols of a subframe, as opposed to the Rel-8/9/10 PDCCH which spans only first 1~4 OFDM symbols of the sub frame. Unlike the PDCCH, the EPDCCH can be accompanied by Dedicated Reference Signals or Demodulation Reference Signals (DMRS), which can be used by the UE 106 to demodulate or decode the EPDCCH. The EPDCCH and the associated DMRS can be transmitted in the same subframe. This can be contrast to PDCCH demodulation which is based on Cell-specific Reference Signals (CRS) where the CRS are transmitted in all DL sub frames and CRS may be present in the subframes even if the UE is not receiving any PDCCH. The EPDCCH may be sent in a set of Physical Resource Blocks (PRBs) which can be signaled via higher layer signaling or known to the UE 106 through other means. The UE monitoring of the control channels may be of various types including the following:

1. UE monitors only PDCCH in a DL subframe (i.e., similar to Rel-8/9/10);
2. UE monitors only EPDCCH in a DL subframe;
3. UE monitors both PDCCH and EPDCCH in a DL subframe (the total number of blind decodes are split between PDCCH and EPDCCH monitoring);
   a. UE monitors CSS (Common Search Space, typically to look for broadcast control messages such as paging, System Information (SI), Random Access (RA) response, etc.) for PDCCH and UESS (UE-Specific Search Space) for EPDCCH;
   b. UE monitors CSS and some UESS for PDCCH and UESS for EPDCCH;
   c. UE monitors UESS for PDCCH and CSS for EPDCCH;
   d. UE monitors CSS for PDCCH and CSS for EPDCCH and UESS for PDCCH and UESS for EPDCCH; and/or
   e. UE monitors CSS and UESS for EPDCCH in a first set of subframes and monitors CSS and UESS for PDCCH in a second set of subframes, where the first and second set of subframe may or may not overlap.

It is noted that the CSS in the PDCCH and CSS in the EPDCCH may be distinct, i.e., have different characteristics, such as different time-frequency locations, different RS for demodulation, etc. Thus, in some instances, the CSS in the EPDCCH may also be referred to as an enhanced Common Search Space (or eCSS) for distinction. Similarly, it is noted that the UESS in the PDCCH and UESS in the EPDCCH may be distinct, i.e., have different characteristics such as different time-frequency locations, different RS for demodulation, etc. Thus, in some instances, the UESS in the EPDCCH may also be referred to as an enhanced UE-specific Search Space (or eUESS) for distinction. Other search spaces such as carrier-specific search space, virtual cell-specific search space, etc may also be defined.

Figure 2:
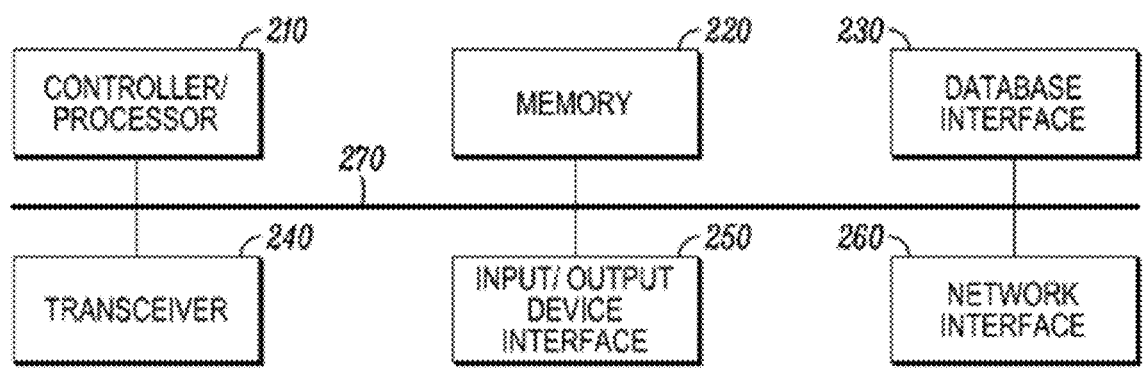
FIG. 2 is an example illustration of a configuration of a computing system to act as a base station according to a possible embodiment.

FIG. 2 illustrates a possible configuration of a computing system to act as a base station 104. The base station 104 may include a processor/controller 210, a memory 220, a database interface 230, a transceiver 240, input/output (I/O) device interface 250, and a network interface 260, connected through bus 270. The base station 104 may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework.

The processor/processor 210 may be any programmable processor. The subject of the disclosure may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this disclosure.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, or other removable memory device that allows media content to be directly uploaded into the system. Data may be stored in the memory 220 or in a separate database. The database interface 230 may be used by the processor/controller 210 to access the database. The database may contain any formatting data to connect the UE 106 to the network 102. The transceiver 240 may create a data connection with the UE 106. The transceiver may configure a Physical Downlink Control Channel (PDCCH) and a Physical Uplink Control Channel (PUCCH) between the base station 104 and the UE 106.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 106. The network connection interface 260 may be used to connect a client device to a network. The network connection interface 260 may be used to connect the teleconference device to the network connecting the user to other users in the teleconference. The components of the base station 104 may be connected via an electrical bus 270, for example, or linked wirelessly.

Client software and databases may be accessed by the processor/processor 210 from memory 220, and may include, for example, database applications, word processing applications, as well as components that embody the decision support functionality of the present disclosure. The base station 104 may implement any operating system, such as Microsoft Windows®, LINUX, or UNIX, for example. Client and server software may be written in any programming language, such as C, C++, Java or Visual Basic, for example. Although not required, the disclosure is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
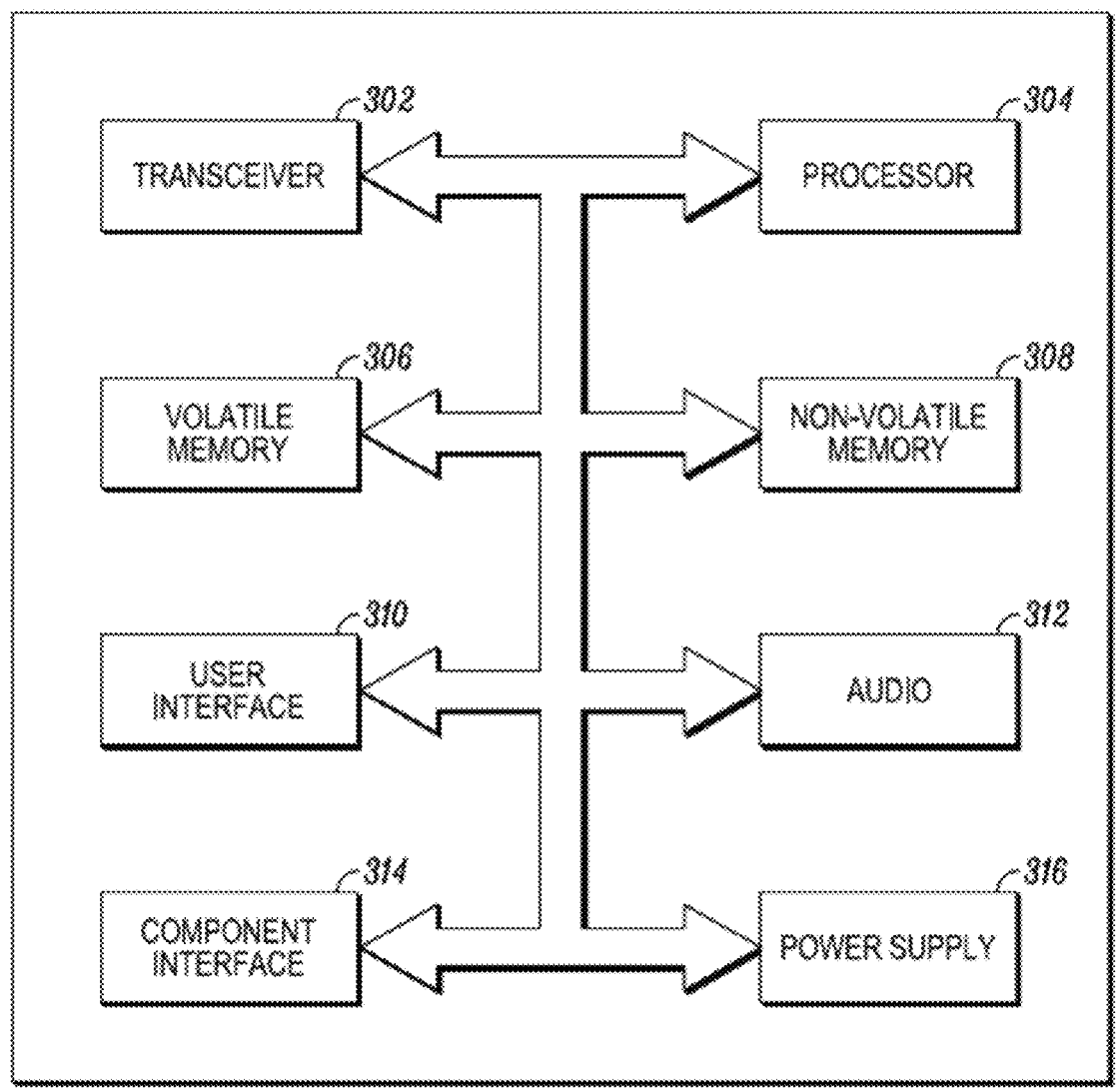
FIG. 3 is an example illustration of a user equipment block diagram according to a possible embodiment.

FIG. 3 illustrates in a block diagram one embodiment of a telecommunication apparatus or electronic device to act as the UE 106. The UE 106 may be capable of accessing the information or data stored in the network 102. For some embodiments of the disclosure, the UE 106 may also support one or more applications for performing various communications with the network 102. The UE 106 may be a handheld device, such as, a mobile phone, a laptop, or a personal digital assistant (PDA). For some embodiments, the UE 106 may be WiFi® capable device, which may be used to access the network 102 for data or by voice using VOIP.

The UE 106 may include a transceiver 302, which is capable of sending and receiving data over the network 102. The UE 106 may include a processor 304 that executes stored programs. The UE 106 may also include a volatile memory 306 and a non-volatile memory 308 which are used by the processor 304. The UE 106 may include a user input interface 310 that may comprise elements such as a keypad, display, touch screen, and the like. The UE 106 may also include a user output device that may comprise a display screen and an audio interface 312 that may comprise elements such as a microphone, earphone, and speaker. The UE 106 also may include a component interface 314 to which additional elements may be attached, for example, a universal serial bus (USB) interface. Finally, the UE 106 may include a power supply 316.

In operation, the processor 304 can receive a first type of reference signal. The processor 304 can monitor a first type of control channel, such as a Physical Downlink Control Channel (PDCCH). The first control channel can be demodulated based on the first type of reference signal, such as a Cell-specific Reference Signal (CRS). The processor 304 can estimate a first synchronization condition, such as an out-of-synchronization (OOS) or an in-synchronization (IS) condition, associated with the radio link based on the first type of reference signal.

The processor 304 can acquire configuration information related to configuration of a second type of control channel, such as an Enhanced Physical Downlink Control Channel (EPDCCH) received on the first carrier. The second control channel can be demodulated based on a second type of reference signal. The processor 304 can receive the second type of reference signal. The second reference signal can be distinct from the first type of reference signal. For example, the second type of reference signal can be a Channel State Information Reference Signal (CSI-RS) or a Demodulation Reference Signal (DMRS). The first type of reference signal and the second type of reference signal may be received on the same carrier. Alternatively, the first type of reference signal may be received on a first carrier and the second type of reference signal may be received on a second carrier, where the second carrier can be distinct from the first carrier. Also the first type of reference signal may be received in a first set of subframes and the second type of reference signal may be received in a second set of subframes. The first and second set of subframes may overlap or may not overlap.

The processor 304 can monitor the second type of control channel. The processor 304 can estimate a second synchronization condition (OOS) associated with the radio link based on a second type of reference signal. The processor 304 can send an output from a current layer to a higher layer based on at least one of the estimated synchronization conditions. The processor 304 can send an indicator to a base station based on the output sent to the higher layer.

According to a related embodiment, the processor 304 can acquire signaling, such as an EPDCCH configuration signal, configuring the user equipment 106 to monitor a first type of control channel (EPDCCH). The first type of control channel demodulated based on a first type of reference signal (DMRS).

The processor 304 can receive a second type of reference signal, such as a CSI-RS, in at least one or more sets of resource blocks or a resource block set. The processor 304 can estimate a synchronization condition based on the received second type of reference signal, such as the CSI-RS, and at least one attribute of the control channel. The processor 304 can also estimate the synchronization condition based on the received second type of reference signal, such as a CSI-RS, and the first type of reference signal, such as a DMRS. The processor 304 can send an output from a current layer to a higher layer in the UE 106 based on the estimated synchronization condition.

The processor 304 can estimate the synchronization condition based on the received second type of reference signal, such as a CSI-RS, and at least one attribute of the first type of control channel, such as an attribute of EPDCCH. The processor 304 can estimate the synchronization condition based on a third type of reference signal (CRS) and at least one attribute of a second type of control channel (PDCCH).

The processor 304 can also estimate a synchronization condition by determining a channel state based on the received second type of reference signal wherein the second type of reference signal is received on an antenna port and by ascertaining the synchronization condition based on the channel state. The processor 304 can acquire signaling to configure the user equipment to monitor a search space used by the control channel.

The first type of reference signal can be the same as the third type of reference signal. The second type of reference signal can be the same as the third type of reference signal. The first type of reference signal can also be distinct from the second type of reference signal.

The processor 304 can detect a synchronization condition by estimating a channel state based on the second type of reference signal. The processor 304 can estimate a Block Error Rate (BLER) corresponding to a reference scheduling grant. For example, the reference scheduling grant can be downlink or uplink, can have a DCI Format size, and/or can have an associated Search space. The processor 304 can compare the block error rate to a threshold to detect a synchronization condition.

According to a related embodiment, the UE 106 can use a different method for OOS/IS condition based on the type of control channel the UE 106 is monitoring. For example, when the UE 106 monitors the PDCCH, it can use the PDCCH reference (1A with 8 CCE for OOS condition and 1C with 4CCE for IS condition) and Cell-specific Reference Signal (CRS) for Radio Link Monitoring (RLM), and when the UE 106 is configured to monitor the EPDCCH, it can use the EPDCCH reference (1A with 8 eCCE for OOS and 1C with 4 eCCE for IS) and a second reference signal (DMRS or CSI-RS) for RLM. The configuration of the resources used for EPDCCH can be done via higher-layer signaling. A hybrid scheme is also possible. For example, if the UE 106 is configured to monitor CSS for PDCCH and UESS for EPDCCH, the OOS may be based on the legacy control channel (PD-CCH), such as 1C with 4CCE, and the IS may be based on EPDCCH (1A with 8 eCCE) and vice-versa. In another example, the UE 106 can be configured to monitor UESS and CSS for PDCCH in a first set of subframes (or a subframe subset) where the PDCCH can be demodulated using a third type of reference symbol (e.g. CRS) and can be configured to monitor UESS and CSS for EPDCCH in a second set of subframes (or a subframe subset) where the EPDCCH can be demodulated using a first type of reference symbol (e.g. DMRS). In this example, the OSS and IS may be based on any combination of UE 106 monitoring with a PDCCH reference with the third type of reference symbol (which may only occur in the first set of subframes (or a subframe subset)) and/or UE 106 monitoring with a EPDCCH reference using a first and/or second type of reference symbol (DMRS and/or CSI-RS) for RLM (where the EPDCCH may only occur in the second set of subframes (or a subframe subset)).

Further operations of the UE 106 are described in the methods below.

Figure 4:
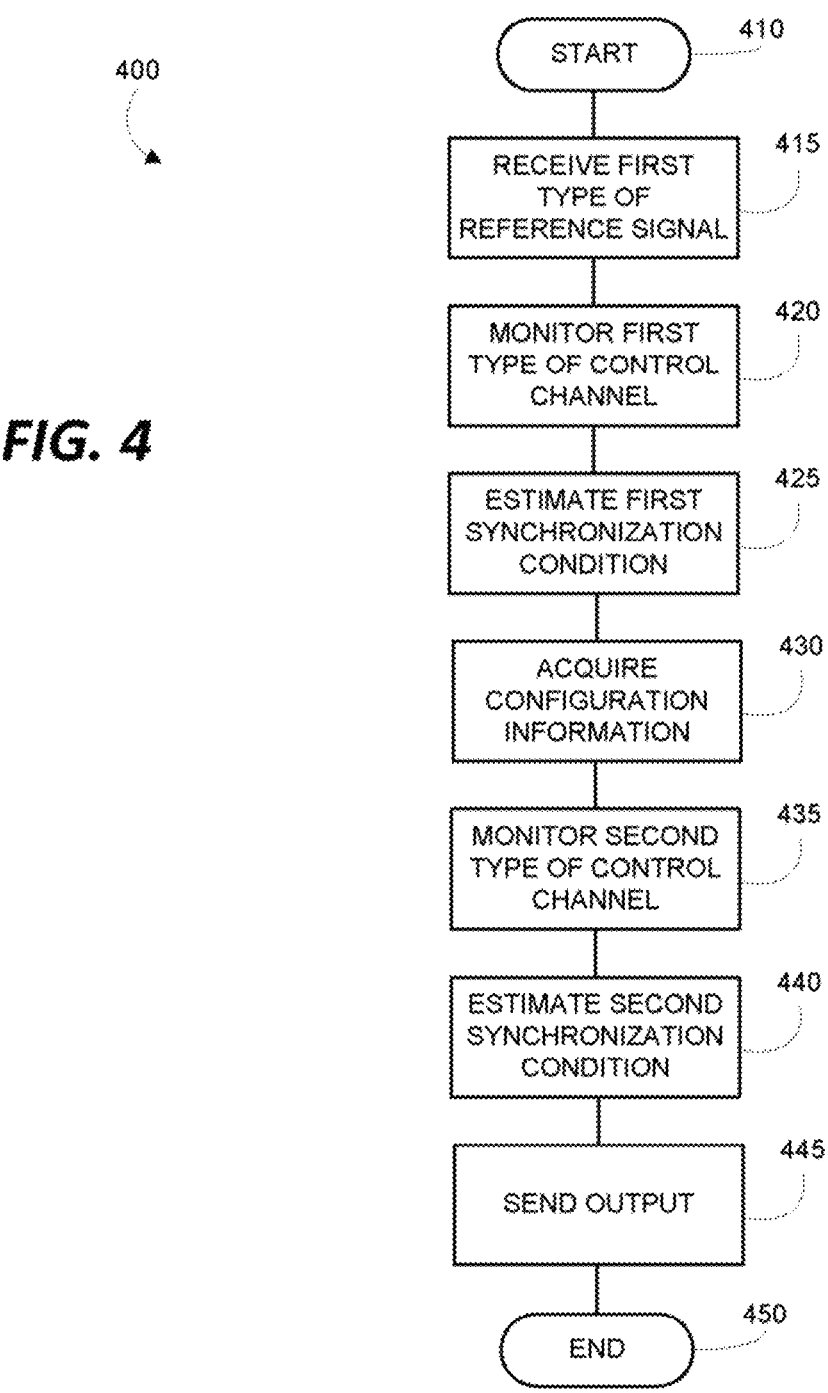
FIG. 4 is an example illustration of a method for determining a radio link quality of a radio link according to a possible embodiment.

FIG. 4 is an example illustration of a method 400 for determining a radio link quality of a radio link by the UE 106 according to a possible embodiment. At 415, the UE 106 can receive a first type of reference signal.

At 420, the UE 106 can monitor a first type of control channel, the first type of control channel demodulated based on the first type of reference signal. The UE 106 can monitor the first type of control channel by monitoring a first common search space associated with the first type of control channel. At 425, the UE 106 can estimate a first synchronization condition (OOS) associated with the radio link based on the first type of reference signal. The first type of control channel monitored can span the entire first carrier bandwidth and the second type of control channel monitored can span only a portion of the first carrier bandwidth. The UE 106 can assume that the first type of control channel monitored can span the bandwidth of a first carrier used for transmitting the first type of control channel. The UE 106 can also assume that the second type of control channel monitored spans only a portion of the bandwidth of a second carrier used for transmitting the second type of control channel.

At 430, the UE 106 can acquire configuration information related to configuration of a second type of control channel, such as an EPDCCH. The second type of control channel can be demodulated based on a second type of reference signal. The second reference signal can be distinct from the first type of reference signal, such as a CSI-RS or a DMRS.

At 435, the UE 106 can monitor the second type of control channel. The UE 106 can monitor the second type of control channel by monitoring a second common search space associated with the second type of control channel. It is noted here that the UE can monitor a control channel may also imply that the UE can monitor for the control channel. This covers the case where the UE is looking for, but may not receive valid DCI, e.g. is some subframes or in DRX period. It can be understood that the monitoring step implies the UE performing an attempt to detect a control channel. Similarly, instead of a subset of subframes, a subframe subset can be used. Similarly, instead of a set of resource blocks, a resource block set can be used.

At 440, the UE 106 can estimate a second synchronization condition, such as out-of-sync (OOS) associated with the radio link based on the second type of reference signal. The second synchronization condition can be estimated based on at least one of a set of configured Virtual Resource Blocks (VRBs) (virtual resource block set) or a set of configured subframes (or a subframe subset). The second synchronization condition can be estimated based on antenna port set configuration for EPDCCH transmission. For example, an EPDCCH configuration message can indicate that a DMRS antenna port 7 is used or that a DMRS antenna port set {8,10} with rank 2 transmission (or transmit diversity scheme) is used. The second synchronization condition can also be estimated based on Energy Per Resource Element (EPRE) information relating to EPDCCH transmission. For example, the EPDCCH configuration message can include the range of EPDCCH power boosts that the eNB intends to use relative to for example, CRS or CSI-RS, such as by signaling a ratio of the EPDCCH EPRE to CRS EPRE or a EPDCCH EPRE to CSI-RS EPRE (or to any other reference signal) for EPD-CCH. The second synchronization condition can also be estimated based on assuming at least one of a hypothetical or a reference downlink assignment or an uplink grant. Further assumptions for estimating the second synchronization condition can be acquired via configuration signaling or higher layer signaling. For example, the assumptions for the second synchronization condition can include enhanced Control Channel Element (CCE) size, enhanced CCE aggregation level, and other assumptions. The second synchronization condition (OOS) associated with the radio link that is further based on the first type of reference signal can be further estimated. As an example, an out-of-synchronization condition of the radio link can be determined if the first synchronization condition is out-of-synchronization and the second synchronization condition is out-of-synchronization.

At 445, the UE 106 can send an output from a current layer to a higher layer based on at least one of the estimated synchronization conditions. For example, the output can signal the UE 106 to stop receiving second control channel or to switch control channels. Sending the output can also include sending an estimated condition, can include sending an channel quality indicator, can include sending information regarding the synchronization condition, or can include sending any other output based on an estimated condition. The UE 106 can send an output by sending an indicator to a base station via the transceiver 302 based on the output sent to the higher layer. Both layers are may be inside the processor 304 and the UE can also send an output from one layer inside the processor 304 to another layer inside the processor 304.

The first type of control channel can be a Physical Downlink Control Channel (PDCCH) and the second type of control channel can be an enhanced Physical Downlink Control Channel (EPDCCH). The first type of reference signal can be a Cell-specific Reference Signal (CRS) and the second reference signal can be a Demodulation Reference Signal (DMRS) or a Channel State Information Reference signal (CSI-RS).

A synchronization condition can be an out-of-synchronization condition (OOS) or an in-synchronization (IS) condition. For example, the first synchronization condition can be an out-of-synchronization condition and the second synchronization condition can be an in-synchronization condition. As a further example, indications of these conditions can be used by a higher layer such as the radio resource control layer or Layer 3 to trigger a radio link monitoring procedure. According to one example, if Layer 3 receives, a number of OOS indications, such as based on a N311 counter, a T310 timer can be started. If no IS indications are received before T310 expires, the Layer 3 can declare a Radio Link Failure and can suspend uplink transmissions. As an alternate example, if Layer 3 receives a number of IS indications, such as based on a N313 counter, before T310 expires, the Layer 3 can declare a Radio Link Recovery and the UE 106 can resume normal operation. The value of the timers and counters may vary based on the RLM technique being used in the UE. At 450, the method 400 can end.

Figure 5:
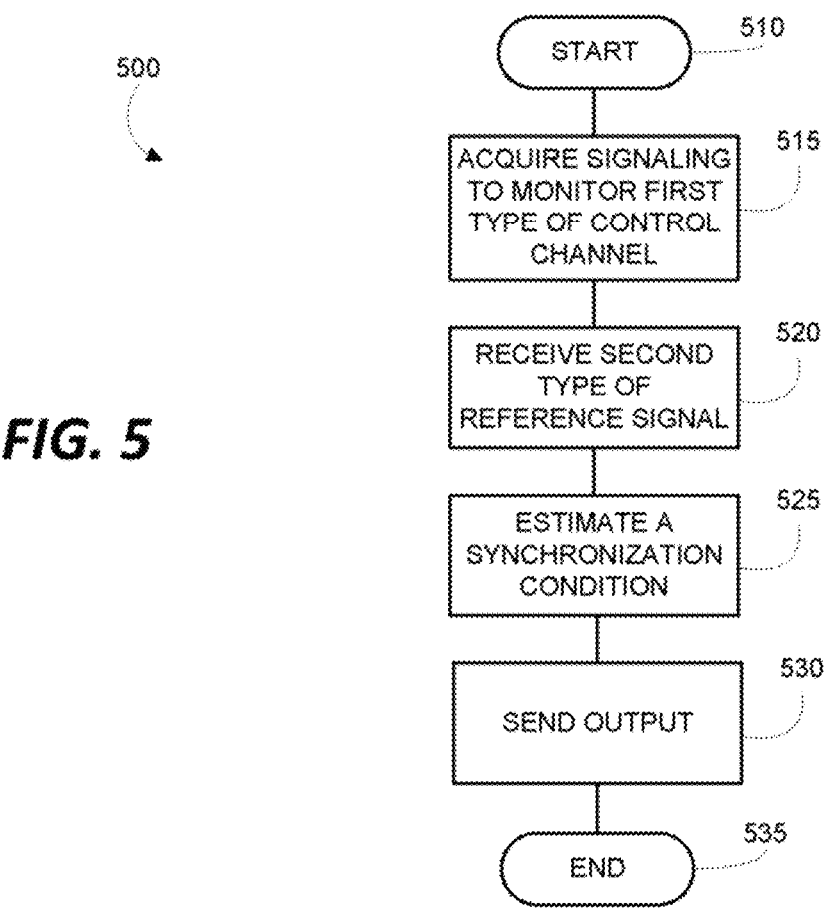
FIG. 5 is an example illustration of a method for determining a radio link quality of a radio link according to a possible embodiment.

FIG. 5 is an example illustration of a method 500 for determining a radio link quality of a radio link by the UE 106 according to a possible embodiment. At 510, the method begins. At 515, a UE 106 can acquire signaling, such as an Enhanced Physical Downlink Control Channel (EPDCCH) configuration signal. For example, the processor 304 can acquire signaling based on which the user equipment monitors for a first type of control channel, where the first type of control channel can be demodulated based on a first type of reference signal. The signaling can identify one of a configured set of Resource Blocks (RBs) or resource block set. The signaling can also identify at least one antenna port associated with the control channel. For example, DMRS for EPDCCH can use antenna ports 7-10. The signaling can also identify at least one configured subframe subset containing a second type of reference signal. The signaling can configure the UE 106 to monitor a first type of control channel, such as an EPDCCH. The first type of control channel can be demodulated based on a first type of reference signal, such as a Demodulation Reference Signal (DMRS).

At 520, the UE 106 can receive the second type of reference signal, such as a Channel State Information Reference Signal (CSI-RS), in at least one or more sets of resource blocks (or resource block set). The resource blocks may be resource blocks or virtual resource blocks. The virtual resource blocks can be localized virtual resource blocks, such as a set of contiguous RBs, or distributed virtual resource blocks, such as a set of non-contiguous RBs distributed across the downlink transmission bandwidth. The second type of reference signal can be distinct from the first type of reference signal. For example, the second type of reference signal can be a CSI-RS and the first type of reference signal can be a DMRS.

As a further example, higher layer signaling can be received, where the higher layer signaling can configure the UE 106 to monitor a search space used by a control channel where the control channel can be demodulated based on a demodulation reference signal (DMRS). A DMRS transmission can be received over a set of resource blocks. Then, a synchronization condition can be determined based on the DMRS and higher layer signaling. As another example of DMRS, the DMRS for EPDCCH can use antenna ports 7-10. The higher-layer signaling can includes a set of subframes over which the first type of reference signal, such as a DMRS, is received. As a further example, an eNB 104 can configure transmission of DMRS with some pre-determined periodicity.

At 525, the UE 106 can estimate a synchronization condition based on the received second type of reference signal and based on at least one attribute of the control channel. The attribute of the control channel can be received from the EPDCCH configuration signaling, can be separate signaling, can be set according to a specification, such as 1A/6 eCCE, 1C/5 eCCE, or other enhanced Control Channel Elements (CCE), or it can be otherwise determined. Since the eCCE size may be variable based on the subframe configuration, a reference eCCE size used for estimation of the synchronization may be signaled by the eNB either implicitly or explicitly or may be derived by the UE implicitly or explicitly. In one example, an eCCE size may vary from 18 Resource Elements to 144 Resource Elements and in another example, an eCCE size may be defined as the number of resource elements available for an ePDCCH in one Resource Block pair. The UE 106 can estimate a synchronization condition based on the received second type of reference signal, such as CSI-RS and based on the first type of reference signal, such as DMRS.

The UE 106 can estimate a synchronization condition based on the received second type of reference signal, such as the CSI-RS, and at least one attribute of the first type of control channel, such as the EPDCCH and also based on a third type of reference signal, such as a Cell-specific Reference Signal (CRS), and at least one attribute of a second type of control channel, such as a legacy Physical Downlink Control Channel (PDCCH). The synchronization condition can be an out-of-synchronization condition or an in-synchronization condition. The at least one attribute of the control channel can be a reference enhanced control channel element (eCCE) size, can be a reference aggregation level for aggregation of eCCEs, can be a localized or a distributed transmission of the eCCEs, can be a reference transmission scheme associated with the control channel or the eCCE, can be a reference search space associated with the control channel, or can be any other attribute.

At 530, the UE 106 can send an output from a current layer to a higher layer in the UE 106 based on the estimated synchronization condition. For example, the UE 106 can send an output from a physical layer or a Layer 1 to a higher layer in the UE 106. Both layers are may be inside the processor 304 and the UE can send an output from one layer inside the processor 304 to another layer inside the processor 304.

According to a related embodiment, at 515, the UE can acquire signaling to configure the UE 106 to monitor a search space used by the control channel. At 525, the UE 106 can estimate a synchronization condition based on the received second type of reference signal, such as a CSI-RS, and at least one attribute of the control channel by determining a channel state based on the received second type of reference signal where the second type of reference signal is received on an antenna port and by ascertaining the synchronization condition based on the channel state. The UE 106 can determine the channel state based on a signal-to-noise ratio (SNR) gain parameter, where the signal-to-noise ratio gain parameter can be acquired via signaling. The signaling can be higher than physical layer signaling, or the parameter can be in EPDCCH configuration signaling. Alternatively, the SNR gain parameters (or transmit beam forming weights) acquired from higher layer signaling can be used in connected non-DRX mode and a pre-determined constant SNR gain (such as SNR gain of 0 dB) can be assumed for DRX mode. The UE 106 can determine the channel state based on a transmission scheme, where transmission scheme information can be acquired via signaling. Again, the signaling can be higher than physical layer signaling, or transmission scheme information can be in the EPDCCH configuration signaling.

The higher-layer signaling can include a set of resource blocks (or resource block set) over which synchronization detection can be performed. The higher-layer signaling can also include an antenna port index associated with the first type of reference channel over which synchronization detection must be performed. At 530, the method 500 can end.

Figure 6:
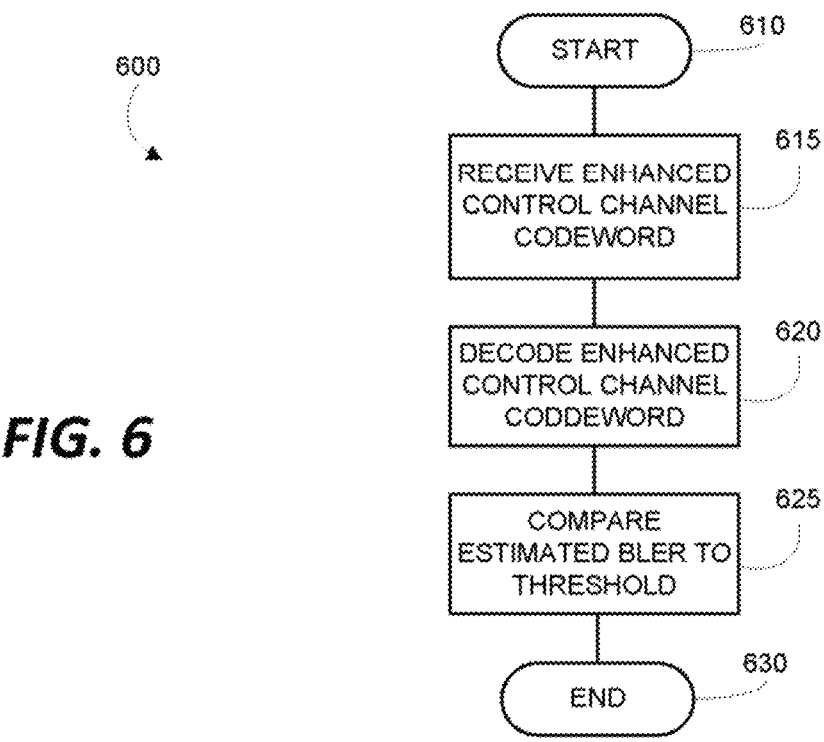
FIG. 6 is an example illustration of a method for determining a radio link quality of a radio link according to a possible embodiment.

FIG. 6 is an example illustration of a method 600 for determining a radio link quality of a radio link by the UE 106 according to a possible embodiment. Elements of the method 600 can be combined with elements of the method 500. At 610, the method begins. At 615, the UE can receive an enhanced control channel codeword, such as an EPDCCH codeword, on a same set of resource blocks as the first type of reference signal, such as a demodulation reference signal. At 620, the UE can decode the enhanced control channel codeword. At 625, the UE can compare an estimated Block Error Rate (BLER) to a threshold to detect the synchronization condition. The BLER may correspond to a hypothetical EPDCCH transmission such as DCI 1A (i.e. for a reference payload size) with 8 eCCE (e.g. corresponding to a reference coding rate and/or modulation and/or transmission scheme). At 630, the method 600 can end.

Figure 7:
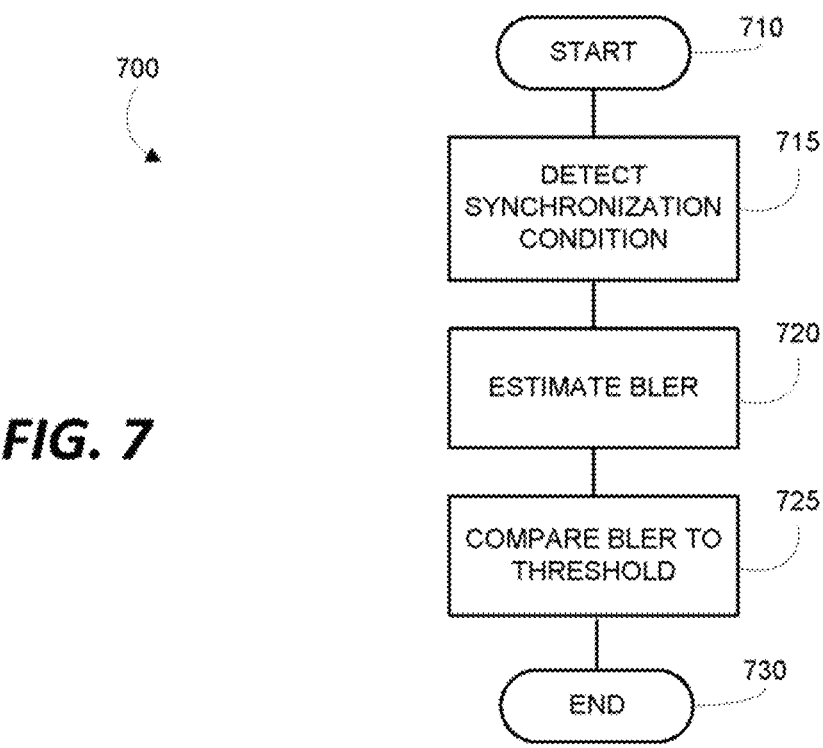
FIG. 7 is an example illustration of a method for determining a radio link quality of a radio link according to a possible embodiment.

FIG. 7 is an example illustration of a method 700 for determining a radio link quality of a radio link according to a possible embodiment. Elements of the method 700 can be combined with elements of the other methods above. At 710, the method begins. At 715, the UE 106 can detect a synchronization condition by estimating a channel state based on the second type of reference signal. At 720, the UE 106 can estimate a Block Error Rate (BLER) corresponding to a reference scheduling grant. The reference scheduling grant can be a downlink scheduling grant, can be an uplink scheduling grant, can have a Downlink Control Information (DCI) format size, and/or can have an associated search space. At 725, the UE 106 can compare the block error rate to a threshold to detect a synchronization condition. At 730, the method can end.

Figure 8:
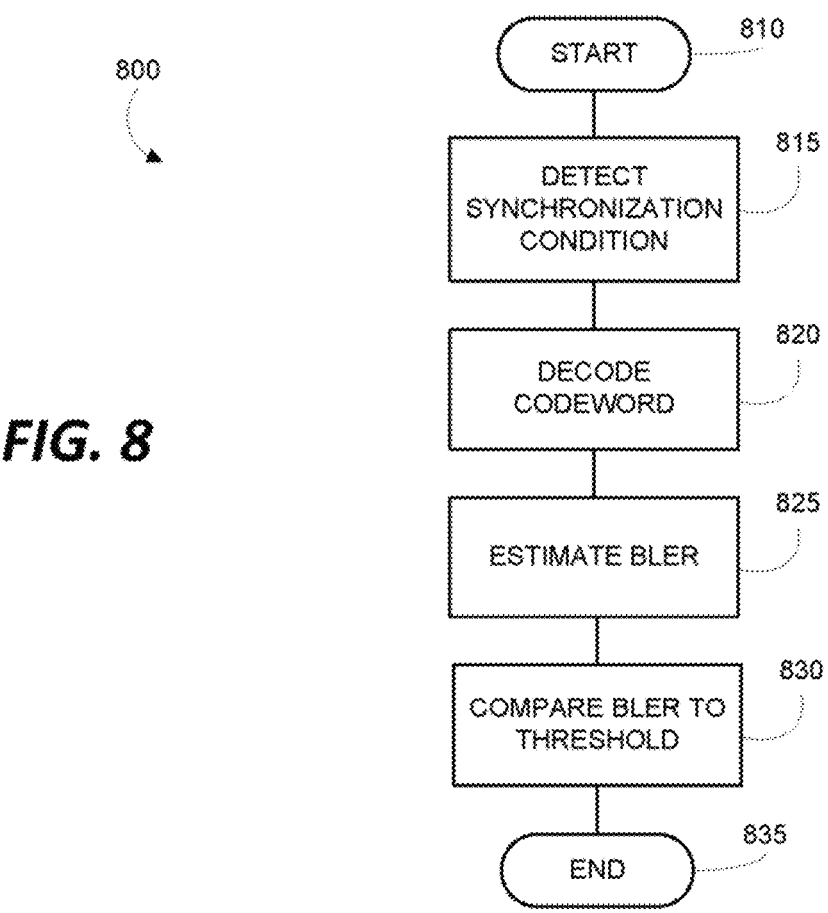
FIG. 8 is an example illustration of a method for determining a radio link quality of a radio link according to a possible embodiment.

FIG. 8 is an example illustration of a method 800 for determining a radio link quality of a radio link according to a possible embodiment. Elements of the method 700 can be combined with elements of the other methods above. At 810, the method can begin. At 815, the UE 106 can detect a synchronization condition by receiving an enhanced control channel codeword on a subset of resource blocks. For example the UE 106 can perform a cyclic redundancy check (CRC) check on EPDCCH. At 820, the UE 106 can decode the codeword. For example, the UE 106 can determine whether the CRC passed or failed. At 825, the UE 106 can estimate a Block Error Rate (BLER) based on the decoding. At 830, the UE 106 can compare the estimated BLER to a threshold to detect the synchronization condition, such as an out-of-sync or in-sync condition. At 835, the method can end.

Embodiments can detect out-of-sync and in-sync conditions based on CRS and DMRS. A UE can use a different method for OOS/IS condition based on the type of control channel the UE is monitoring. For example, when the UE monitors the PDCCH, it can use a PDCCH reference, such DCI Format 1A with 8 CCE and Format 1C with 4CCE and CRS for RLM. When the UE is configured to monitor the EPDCCH, it can use DCI Format 1A with 8 enhanced CCE (eCCE) and DCI Format 1C with 4 eCCE and a second reference signal, such as DMRS or CSI-RS for RLM. The configuration of the resources used for EPDCCH can be done via higher-layer signaling. A related embodiment can use a hybrid scheme where the UE can be configured to monitor Common Search Space (CSS) in PDCCH and UE-Specific Search Space (UESS) in EPDCCH. The OOS may be based on EPDCCH, such as 1A with 8eCCE and the IS can be based on legacy indication, such as Format 1C with 4 CCE, and vice-versa.

According to some embodiments, a UE can use DMRS for EPDCCH demodulation, but the DMRS may not be present in every subframe. Thus, the UE can use the CSI-RS to determine the channel condition and use that to detect OOS/IS events. According to some embodiments, an eNB can configure periodic CSI-RS schedule, such as 1 subframe out of 40 subframes, the eNB can transmit CSI-RS according to this schedule, and the UE uses the CSI-RS and the configuration information to detect OOS/IS events. According to some embodiments, the eNB can configure periodic DMRS schedule, such as 1 subframe out of 40 subframes, the eNB can transmit DMRS according to this schedule where precoding to generate DMRS in these subframes can be identical to what is used for EPDCCH transmission, and the UE can use this information to detect OOS/IS events.

For behavior upon RLF detection, the Rel-8 UE procedure for RLM does not involve network signaling (i.e., UE RLF is deduced by the network by suspension of UE UL transmission after the expiry a timer). But, with EPDCCH on the other hand, UE sending an indication that an RLF has occurred can lead to measures for improving the EPDCCH link by the eNB such as to re-configuration of EPDCCH configuration such as changing of antenna precoding coefficients associated with DMRS ports, EPDCCH power boosting, changing of the set of RBs configured for EPDCCH, etc. Therefore, UE can indicate that an RLF has occurred (or near occurrence) to the eNB. The UE can suspend UL until T310 expires and then attempt RRC connection re-establishment if the EPDCCH is not configured before the timer expires. The ACK/NACK PUCCH resources available to the UE to transmit uplink signals can be configured via higher layer signaling. Thus, if such resources are available, the UE may use those resources for sending an indication to the eNB that an RLF has occurred.

For taking minimum across block error rates, the UE may use both the EPDCCH and the PDCCH to maintain the radio link. In that case, the UE may detect (or trigger) an event only if the quality on both the EPDCCH and PDCCH deteriorate, e.g. a UE may declare an OOS event only if the PDCCH BLER estimate falls below a threshold and the EPDCCH BLER estimate falls below the same or a different threshold.

For OOS detection, the UE can receive a first type of reference signal, such as CRS, and a second type of reference signal such as DMRS. The UE can compute BLER for both possibilities, CRS and DMRS and send an out-of-sync indication if $\min(BLER_{PDCCH}, BLER_{EPDCCH})$ exceeds a Qout threshold (say, $\min(BLER_{CRS}, BLER_{DMRS}) > 10\%$), where $BLER_{CRS}$ is BLER corresponding to hypothetical DCI 1A 8CCE transmission assuming CRS demodulation and $BLER_{DMRS}$ is BLER corresponding to hypothetical DCI 1A with 6eCCE transmission assuming DMRS demodulation.

For IS detection, the UE can receive a first type of reference signal such as CRS and a second type of reference signal such as DMRS. The UE can compute BLER for both possibilities, CRS and DMRS and send in-sync indication if $\min(BLER_{PDSCCH}, BLER_{EPDCCH})$ falls below a Qin threshold (say, $\min(BLER_{CRS}, BLER_{DMRS}) < 2\%$), where $BLER_{CRS}$ can be BLER computed for hypothetical DCI 1C 4CCE transmission assuming CRS demodulation and $BLER_{DMRS}$ is BLER computed for hypothetical DCI 1C 2eCCE transmission assuming DMRS demodulation.

Figure 9:
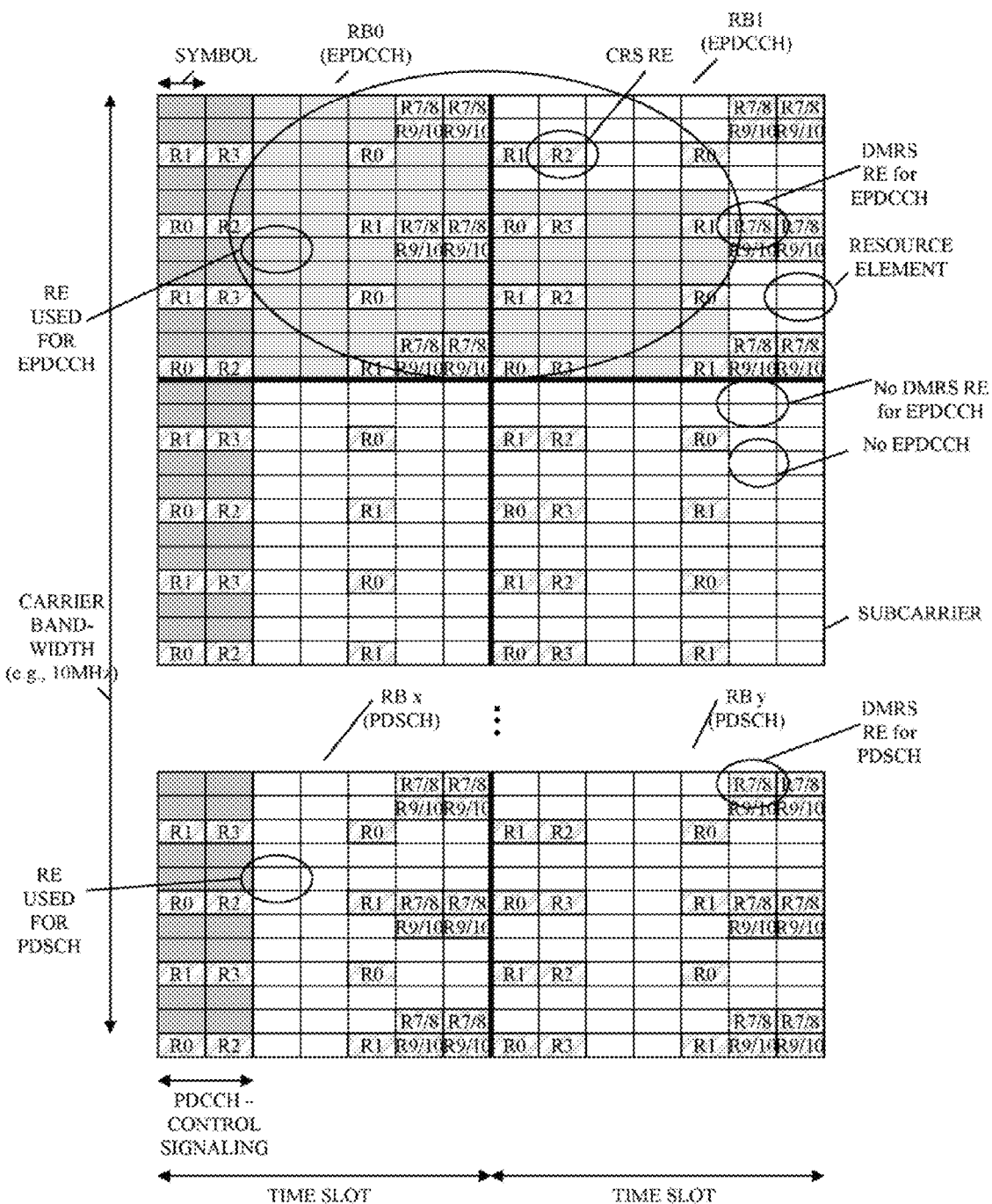
FIG. 9 is an example illustration of a time-frequency diagram of an example subframe structure according to a possible embodiment.

FIG. 9 is an example illustration of a time-frequency diagram 900 of an example subframe structure according to a possible embodiment. The time-frequency diagram 900 of the subframe structure can depict example distributions of reference signals, and particularly Common Reference Signals (CRS) and UE specific reference signals (UERS) or Demodulation reference signals (DMRS), in a OFDMA subframe that may be employed by communication system 100 in accordance with various embodiments of the present disclosure. A vertical scale of time-frequency diagram 900 depicts multiple blocks of frequency, or frequency bins, (frequency subcarriers) of the subframe that may be allocated. A horizontal scale of time-frequency diagram 900 depicts multiple blocks of time (in units of OFDM symbols) of the subframe that may be allocated. A subframe comprises multiple resource blocks (RBs) such as Resource Block 0 (RB0), Resource Block 1 (RB1), Resource Block 2 (RB2), and Resource Block 3 (RB3), wherein each RB comprises 12 OFDM subcarriers over a time slot comprising seven (7) OFDM symbols for the normal CP case. Typically, the subframe duration is 1 ms and it can comprise two time slots of 0.5 ms duration each. In turn, each RB can be divided into multiple resource elements (REs), wherein each RE is a single OFDM subcarrier, or frequency bin, on a single OFDM symbol.

For LTE Release 11, a UE such as UE 106 can receive the EPDCCH in a set of RBs that may span only a portion of the carrier bandwidth in frequency domain. As depicted in a subframe in time-frequency diagram, the UE 106 may expect to receive the EPDCCH and the PDSCH, wherein the EPDCCH can be sent to the UE in RB0 and RB1 the PDSCH is sent to the UE in RB2 and RB3. In order to decode the information sent on the PDCCH, the UE 106 can perform channel estimation after receiving the PDCCH. To perform channel estimation, the UE 106 can receive Reference Signals (RSs) that can be included in the subframe. The RSs can be associated with one or more antenna ports. For example, RSs labeled R0 can be resource elements carrying reference signals associated with antenna port 0, RSs labeled R1 can be resource elements carrying reference signals associated with antenna port 1, RSs labeled R2 can be resource elements (REs) carrying reference signals associated with antenna port 2, and RSs labeled R3 can be resource elements (REs) carrying reference signals associated with antenna port 3. The RSs associated with antenna ports 0, 1, 2, and 3, can also be known as "Cell-specific Reference Signals (CRS)." In order to demodulate user data (sent on PDSCH), 3GPP LTE Release 10 provides that a UE, such as UE 106, can either use the RSs associated with antenna ports 0, 1, 2, and 3 or can use RSs associated with other antenna ports, such as antenna ports 7, 8, 9, 10, 11, 12, 13, and 14, that is, the UE can use RSs associated with all or a subset of these antenna ports, based on the transmission scheme used for PDSCH reception (in turn, the transmission scheme depends on configuration signaling from the eNB). The RSs associated with these other antenna ports 7, 8, 9, 10, 11, 12, 13, and 14 are typically referred to as "UE specific reference signals (UERS)" or "Demodulation reference signals (DMRS) or Dedicated reference signals (DRS)." Unlike the PDCCH, which is received by the UE using CRS, the EPDCCH is received by the UE using DMRS.

REs labeled R0-R3 (and associated with antenna ports 0-3, respectively) can be allocated to CRS (CRS REs) and REs labeled R7-R10 (and associated with antenna ports 7-10, respectively) are allocated to DMRS (DMRS REs). Typically, RSs corresponding to antenna ports 7 and 8 are multiplexed using CDM (or other scheme) and are mapped to the same REs in time and frequency domain. The subframe can also include other RSs that are distributed in the control regions and/or user data regions of the subframe. These other RSs may be present but are not necessarily used for demodulation of received signals by a UE in an LTE-A communication system. For example, the other RS may include the CSI-RS (Channel State Information reference signal) or muted RS where the UE can assume and zero transmission power on the RS Res that may be useful for interference measurements, or may include positioning RS that may be used for detecting location information, etc. The CSI-RS is typically not used for demodulation purposes and may be present in occasional subframes, i.e. the subframe periodicity and the number of CSI-RS antenna ports are configurable via higher layer signaling. CSI-RS typically occupy REs that are not occupied by CRS, potential DMRS, etc.

Further, RSs corresponding to an antenna port can be allocated to a resource element (RE) pair in user data regions, and more particularly to one of the RE pairs associated with OFDM symbols. For example, pairs of adjacent DMRS RE labeled as R7/8 may be allocated to antenna port 7 and antenna port 8 and, pairs of adjacent DMRS RE labeled as R9/10 may be allocated to antenna port 9 and antenna port 10. In this example, the RS for R7 and R8 can be code-division multiplexed using orthogonal Walsh codes. Similarly, the RS for R9 and R10 can be code-division multiplexed using orthogonal Walsh codes.

The UE 106 can monitor EPDCCH in a set of RBs (EPDCCH RB set) that may span only a portion of the carrier bandwidth in frequency domain. Further, the UE 106 may monitor the EPDCCH in only those time symbols in the subframe that are distinct from the time symbols corresponding to PDCCH. For example, the UE 106 can monitor PDCCH across the entire carrier bandwidth in frequency domain and in time symbols in the time domain (i.e., there are two control symbols in the example). The UE 106 can monitor EPDCCH in one (e.g. RB0) or more RBs (i.e. RB0 and RB1) in frequency domain and symbols or alternately, symbols in the time domain. For example, considering RB0, the UE 106 can monitor EPDCCH in that portion of RB0 that is not allocated for PDCCH. Alternately, RB0 may be defined to cover only the non-PDCCH control region resources i.e. excluding the resources assigned for PDCCH. In an alternate embodiment, RB0 may be defined to start from a pre-determined symbol and occupy the remaining symbols in the slot. The pre-determined symbol may be signaled to the UE via PDCCH or higher layer signalling (e.g., RRC or MAC signalling). To receive the EPDCCH, the UE 106 can monitor several EPDCCH candidates or monitor for the enhanced control channel. Monitoring implies attempting to blindly decode one or more EPDCCH candidates (in this example blind decoding can be attempted for each of the several EPDCCH candidates). It is noted that the DMRS required for EPDCCH decoding may be sent only when EPDCCH is sent, unlike the CRS which is sent always in every subframe even if PDCCH is not sent. Each EPDCCH candidate can be associated with a control channel element (CCE) or a set of aggregated CCEs. As used herein, in the context of the EPDCCH, these can be called enhanced control channel elements (eCCEs) to distinguish them from the CCE terminology used for PDCCH. Each enhanced control channel element (eCCE) can comprise time-frequency resource elements (REs) within the RBs of the EPDCCH RB set. The set of EPDCCH candidates to be monitored by UE 106, that is, the EPDCCH candidate set, can also be defined in terms of search spaces. For example, an EPDCCH search space S_k_L at aggregation level L can refer to a set of EPDCCH candidates where each candidate in the search space is has L aggregated eCCEs. For PDCCH, aggregations of L=1, 2, 4, and 8 CCEs can be supported. For EPDCCH, the same aggregation levels may be supported. However, in another embodiment, since the size of eCCEs can be different from the fixed CCE size of 36 REs, other aggregation levels (e.g. L=3) may be used. Also, since the size of the eCCEs can change considerably between different subframes and slots within a subframe (for example, based on legacy control region size or presence of CSI-RS, based on subframe type), a set of aggregation levels that the UE 106 assumes for EPDCCH monitoring also may vary between subframes or between slots in a same subframe or between different subframe types (for example, a normal subframe vs. an MBSFN subframe). More generally, a set of aggregation levels that the UE assumes for EPDCCH monitoring can vary between a first time period and a second time period. The EPDCCH candidates that UE 106 monitors can be further divided into a set of common search space candidates (or enhanced common search space (eCSS) to differentiate with the CSS for PDCCH), and a set of UE specific search space candidates (or enhanced UE specific search space (eUESS) to differentiate with the UESS for PDCCH). eCSS candidates may be monitored on a EPDCCH RB set that is broadcast to all the UEs in the coverage area of the serving eNB, that is, eNB. For example, in LTE, this information can be broadcasted in a Master Information block (MIB) or in a System Information Block (SIB). The eUESS candidates may be monitored on a EPDCCH RB set that is signaled to the UE via UE specific higher layer signaling.

Typically, the downlink control channel information can be a downlink assignment or an uplink grant. A downlink assignment may include one of more of a downlink resource allocation information, DL HARQ information, DL MIMO information, power control commands, user identifier or RNTI, etc. Similarly, the UL grant may include uplink resource allocation information, uplink HARQ information, uplink MIMO information, power control commands, user identifier or RNTI, etc. The DCI payload can be convolutionally encoded, and then rate-matched and mapped to resource elements based on the search space, where the number of resource elements may be determined based on the aggregation level and CCE size (or eCCE size).

For ease of reference, the following abbreviations may have been used in this disclosure:
RNTI Radio Network Temporary Identifier
HARQ Hybrid Automatic repeat request
MBSFN Multi-Media Broadcast over a Single Frequency Network
MIMO Multiple Input Multiple Output
TxD Transmit Diversity
DL Downlink
UL Uplink
CCE Control Channel Element
BLER Block Error Rate
PDCCH Physical Downlink Control Channel
OOS Out-of-Synchronization
IS In-Synchronization
eNB enhanced Node B
UE User Equipment
OFDM Orthogonal Frequency Division Multiplexing
RLF Radio Link Failure
RLM Radio Link Monitoring
HO Handover
CQI Channel Quality Information
CSI Channel State Information
CRS cell-specific reference signal
CSI-RS CSI-reference signal
DMRS Demodulation reference signal
QPSK Quadrature Phase Shift Keying
QAM Quadrature Amplitude Modulation
DCI Downlink Control Information
UCI Uplink Control Information
PDSCH Physical Downlink Shared Channel
CSS Common Search Space
UESS UE-specific Search Space
PMI Precoding Matrix Indicator
BGI Beamforming Gain Indicator
MAC Medium Access Control
RRC Radio Resource Configuration
SIB System Information Block
MIB Master Information Block Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the present disclosure and the best modes thereof have been described in a manner establishing possession by the inventors and enabling those of ordinary skill to make and use the same, it will be understood that there are equivalents to the exemplary embodiments disclosed herein and that modifications and variations may be made thereto without departing from the scope and spirit of the disclosure, which are to be limited not by the exemplary embodiments but by the appended claims.

What is claimed is:

1. A method in a user equipment of determining a radio link quality of a radio link, the method comprising:
    receiving a first type of reference signal;
    monitoring, at the user equipment, for a first type of control channel, the first type of control channel demodulated based on the first type of reference signal;
    estimating a first synchronization condition associated with the radio link based on the first type of reference signal, the first synchronization condition being one of a group comprising an out-of-synchronization condition and an in-synchronization condition;
    acquiring configuration information related to configuration of a second type of control channel, the second type of control channel demodulated based on a second type of reference signal, the second type of reference signal distinct from the first type of reference signal;
    monitoring for the second type of control channel;
    estimating a second synchronization condition associated with the radio link based on the second type of reference signal, the second synchronization condition being one of a group comprising an out-of-synchronization condition and an in-synchronization condition; and
    sending an output from a current layer to a higher layer based on at least one of the estimated synchronization conditions,
    wherein estimating the second synchronization condition associated with the radio link is further based on energy per resource element information relating to enhanced physical downlink control channel transmission.

2. The method of claim 1, wherein estimating the second synchronization condition associated with the radio link is further based on at least one of a set of configured virtual resource block set and a set of configured subframe set.

3. The method of claim 1, wherein estimating the second synchronization condition associated with the radio link is further based on antenna port set configuration for enhanced physical downlink control channel transmission.

4. The method of claim 1, wherein sending an output further comprises transmitting an indicator to a base station based on the output sent to the higher layer.

5. The method of claim 1, wherein estimating the second synchronization condition associated with the radio link is further based on assuming at least one of a hypothetical downlink assignment or an uplink grant.

6. The method of claim 1, wherein further assumptions for estimating the second synchronization condition are acquired via configuration signaling.

7. The method of claim 1, wherein, monitoring for a first type of control channel comprises monitoring at least one of a first common search space and a first user equipment search space.

8. The method of claim 1, wherein monitoring for the second type of control channel further comprises monitoring at least one of a second common search space and a second user equipment search space.

9. The method of claim 1, wherein the first type of control channel comprises a physical downlink control channel and the second type of control channel comprises an enhanced physical downlink control channel.

10. The method of claim 1, wherein the first type of reference signal comprises a cell-specific reference signal and wherein the second reference signal comprises a demodulation reference signal.

11. The method of claim 1, wherein the first type of reference signal comprises a cell-specific reference signal and wherein the second reference signal comprises channel state information reference signal.

12. The method of claim 1, wherein the first synchronization condition comprises an out-of-synchronization condition and wherein the second synchronization condition comprises an in-synchronization condition.

13. The method of claim 1, further comprising determining an out-of-synchronization condition of the radio link if the first synchronization condition is out-of-synchronization and the second synchronization condition is out-of-synchronization.

14. The method of claim 1, wherein estimating the second synchronization condition associated with the radio link is further based on the first type of reference signal.

15. The method claim 1, wherein the first type of reference signal and the second type of reference signal are received on a first carrier.

16. The method of claim 15, where the first type of control channel monitored spans the entire first carrier bandwidth and where the second type of control channel monitored spans only a portion of the first carrier bandwidth.

17. The method of claim 1, where it is assumed that the first type of control channel monitored spans the bandwidth of a first carrier used for transmitting the first type of control channel and where it is assumed that the second type of control channel monitored spans only a portion of the bandwidth of a second carrier used for transmitting the second type of control channel.

18. A user equipment comprising:
    a transceiver; and
    a processor coupled to the transceiver,
    the processor configured to receive a first type of reference signal,
    the processor configured to monitor, at the user equipment, for a first type of control channel, the first control channel demodulated based on the first type of reference signal,
    the processor configured to estimate a first synchronization condition associated with the radio link based on the first type of reference signal, the first synchronization condition being one of a group comprising an out-of-synchronization condition and an in-synchronization condition, the processor configured to acquire configuration information related to configuration of a second type of control channel, the second control channel demodulated based on a second type of reference signal, the second reference signal distinct from the first type of reference signal, the processor configured to monitor for the second type of control channel, the processor configured to estimate a second synchronization condition associated with the radio link based on a second type of reference signal, the second synchronization condition being one of a group comprising an out-of-synchronization condition and an in-synchronization condition, and the processor configured to send an output from a current layer to a higher layer based on at least one of the estimated synchronization conditions, wherein estimating the second synchronization condition associated with the radio link is further based on energy per resource element information relating to enhanced physical downlink control channel transmission.

19. The user equipment of claim 18, where the processor further sends an output by transmitting an indicator to a base station via the transceiver based on the output sent to the higher layer.

20. The user equipment of claim 18, wherein the first type of control channel comprises a physical downlink control channel and the second type of control channel comprises an enhanced physical downlink control channel.

* * * * *